(12) United States Patent
Asada

(10) Patent No.: US 12,283,164 B2
(45) Date of Patent: Apr. 22, 2025

(54) MEDIUM PROCESSING METHOD

(71) Applicant: Glory Ltd., Himeji (JP)

(72) Inventor: Toshihide Asada, Himeji (JP)

(73) Assignee: GLORY LTD., Himeji (JP)

( * ) Notice: Subject to any disclaimer, the term of this patent is extended or adjusted under 35 U.S.C. 154(b) by 0 days.

(21) Appl. No.: 18/234,894

(22) Filed: Aug. 17, 2023

(65) Prior Publication Data

US 2023/0394933 A1 Dec. 7, 2023

Related U.S. Application Data

(63) Continuation of application No. PCT/JP2022/002868, filed on Jan. 26, 2022.

(30) Foreign Application Priority Data

Feb. 19, 2021 (JP) ................................ 2021-025046

(51) Int. Cl.
G07F 19/00 (2006.01)
(52) U.S. Cl.
CPC .......... G07F 19/208 (2013.01); G07F 19/202 (2013.01); G07F 19/203 (2013.01)
(58) Field of Classification Search
CPC .... G07F 19/208; G07F 19/202; G07F 19/203; G07F 7/00; G07F 19/20; G07F 19/204; G07F 19/206; G06Q 20/042; G06Q 20/1085; G07D 11/20; G07D 11/50; G07D 11/16
See application file for complete search history.

(56) References Cited

U.S. PATENT DOCUMENTS

| | | |
|---|---|---|
| 5,987,439 A | 11/1999 | Gustin et al. |
| 2002/0138446 A1 | 9/2002 | Antonin et al. |
| 2006/0080201 A1* | 4/2006 | Itou ........................ G07F 19/211 |
| | | 705/35 |
| 2007/0278286 A1 | 12/2007 | Crowell et al. |
| 2009/0266879 A1 | 10/2009 | Gustin et al. |
| 2016/0098904 A1 | 4/2016 | Choudhury et al. |
| 2018/0330563 A1 | 11/2018 | Yuasa et al. |

(Continued)

FOREIGN PATENT DOCUMENTS

| | | |
|---|---|---|
| JP | S58-158767 A | 9/1983 |
| JP | H03-51955 A | 3/1991 |

(Continued)

OTHER PUBLICATIONS

JP2003308556A Money Treating Device for Finance Business Branch, 11 pages. (Year: 2024).*
WO2010018625A1 Valuable Medium Management System and Valuable Medium Management Method, 16 pages. (Year: 2024).*
WO2018003969A1 Cash Processing System, Cash Processing Method, Portable Terminal and Cash Processing Machine, 9 pages. (Year: 2024).*

(Continued)

*Primary Examiner* — Tuyen K Vo
(74) *Attorney, Agent, or Firm* — XSENSUS LLP

(57) ABSTRACT

A medium processing method includes receiving, by a primary processing machine, a customer's request for medium processing; in a case where the processing is first processing, storing, by the primary processing machine, a medium targeted for the first processing in the primary processing machine, and accordingly completing the first processing; and in a case where the processing is second processing, providing, by the primary processing machine, a customer with information for guiding the customer to a secondary processing machine.

18 Claims, 9 Drawing Sheets

(56) References Cited

U.S. PATENT DOCUMENTS

| | | | | |
|---|---|---|---|---|
| 2020/0342705 A1* | 10/2020 | Yagi | .................... | G07D 11/009 |
| 2021/0064677 A1* | 3/2021 | Stern | ....................... | G06F 16/29 |

FOREIGN PATENT DOCUMENTS

| | | | | | |
|---|---|---|---|---|---|
| JP | 2003-308556 A | | 10/2003 | | |
| JP | 2008-009672 A | | 1/2008 | | |
| JP | 2010-086016 A | | 4/2010 | | |
| JP | 2012084102 A | * | 4/2012 | ............ | G06F 13/00 |
| JP | 2017-045132 A | | 3/2017 | | |
| JP | 2017-199161 A | | 11/2017 | | |
| JP | 2020-091920 A | | 6/2020 | | |
| WO | 00/75889 A2 | | 12/2000 | | |
| WO | WO-2010018625 A1 | * | 2/2010 | ........... | G06Q 20/381 |
| WO | WO-2018003969 A1 | * | 1/2018 | ......... | G06Q 20/1085 |
| WO | WO-2021080070 A1 | * | 4/2021 | ......... | G06Q 20/1085 |

OTHER PUBLICATIONS

WO2021080070A1 Method and System for Currency Exchange Service By Using Overseas Remittance Method, 17 pages. (Year: 2024).*

JP2016038832A Negotiable Medium Processing Device, Negotiable Medium Processing System, and Negotiable Medium Processing Method, 24 pages. (Year: 2024).*

JP2012084102A Memory Bank System, Automated Teller Machine and Memory Information Registration Machine, 26 pages. (Year: 2024).*

International Search Report and Written Opinion mailed on Mar. 29, 2022, received for PCT Application PCT/JP2022/002868, filed on Jan. 26, 2022, 9 pages including English Translation.

\* cited by examiner

MEDIUM PROCESSING METHOD

CROSS-REFERENCE TO RELATED APPLICATIONS

This application is a bypass continuation of International Patent Cooperation Treaty Application No. PCT/JP2022/002868 filed on Jan. 26, 2022, and Japanese Patent Application No. 2021-025046 filed on Feb. 19, 2021, the entire disclosures of each are incorporated herein by reference.

BACKGROUND

A conventional automatic teller machine (ATM) to which a large-capacity coin depositing and dispensing machine is connected. This ATM is capable of withdrawing or changing a change fund. Moreover, the ATM is capable of reserving cash withdrawal. A user makes reservation using a personal computer or a mobile phone. The user operates the ATM at the reserved date, thereby receiving the cash withdrawn from the ATM.

SUMMARY

A medium processing method disclosed herein includes receiving, by a primary processing machine, a customer's request for medium processing;
  in a case where the processing is first processing, storing, by the primary processing machine, a medium targeted for the first processing in the primary processing machine, and accordingly completing the first processing; and
  in a case where the processing is second processing, providing, by the primary processing machine, a customer with information for guiding the customer to a secondary processing machine.

DETAILED DESCRIPTION

Figure 1:
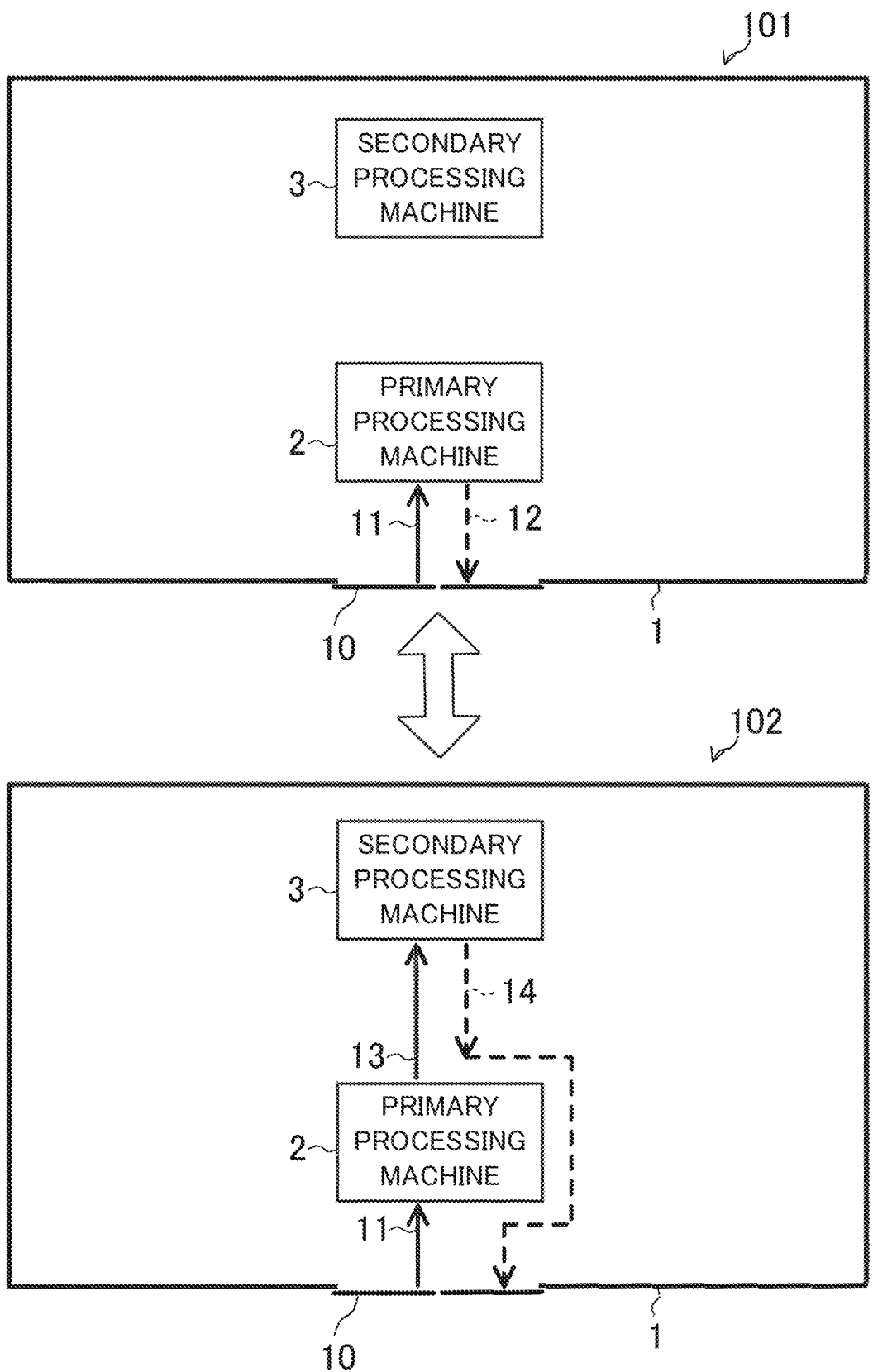
FIG. 1 shows, as an example, a service office of a financial facility where a medium processing method is performed.

For example, in a service office of a bank, an automatic processing machine is placed. The automatic processing machine mainly performs cash depositing and dispending processing and remittance processing from a customer's account. The ATM or a so-called self-processing machine is one example of the automatic processing machine. The self-processing machine can perform remittance processing using a transaction form and check encashment processing in addition to the functions of the ATM.

The user performs desired processing using the automatic processing machine. Depending on the contents of the processing, the user needs to occupy the automatic processing machine for a long period of time. An increase in the occupation time by one user leads to a decrease in an operational efficiency in the service office. Unfortunately, a conventional system cannot solve this problem.

The present disclosure improves an operational efficiency in a financial facility.

A medium processing method disclosed herein includes receiving, by a primary processing machine, a customer's request for medium processing;
  in a case where the processing is first processing, storing, by the primary processing machine, a medium targeted for the first processing in the primary processing machine, and accordingly completing the first processing; and
  in a case where the processing is second processing, providing, by the primary processing machine, a customer with information for guiding the customer to a secondary processing machine.

The primary processing machine assigns the processing machine suitable for the customer's request to the customer. The customer performs the processing using the assigned primary processing machine or secondary processing machine. The operational efficiency in the financial facility is enhanced.

The first processing may be check encashment processing of making deposit to a customer's account, and
  in execution of the first processing, the primary processing machine may take and store a check therein.

Such depositing processing is processing not handling cash. The customer can complete the first processing using the primary processing machine.

The primary processing machine can be configured as a device that neither newly stores cash nor stores cash in advance. Since the primary processing machine does not store cash, the primary processing machine can be simply configured. Note that the primary processing machine may perform printing for invalidation on the stored check. The primary processing machine is a relatively-inexpensive device. The number of primary processing machines placed in the financial facility can be increased. An increase in the number of primary processing machines placed is advantageous in improvement of the operational efficiency in the financial facility. The primary processing machine may be placed in a fixed manner, or may be of a transportable type. The transportable primary processing machine can be placed in a service office of the financial facility when needed, and can be removed from the service office of the financial facility when not needed.

The second processing may be check encashment processing of withdrawing cash, and
  in execution of the second processing, the secondary processing machine may take and store a check therein, and withdraw cash corresponding to the amount of money on the check therefrom.

Such withdrawal processing is processing handling cash. The secondary processing machine is a processing machine handling cash. Of the processing involving the check, the processing handling cash is mainly performed by the secondary processing machine. Each of the primary processing machine and the secondary processing machine can execute the processing involving the check. According to whether or not cash is handled, the processing is assigned to the primary processing machine or the secondary processing machine.

The second processing may be check encashment processing of withdrawing cash, in execution of the second processing, the primary processing machine may take and store a check therein, and provide the customer with the information for guiding the customer to the secondary processing machine, and in execution of the second processing, the secondary processing machine may withdraw cash corresponding to the amount of money on the check therefrom.

The primary processing machine and the secondary processing machine divide up one type of processing, and therefore, the operational efficiency in the financial facility is improved.

The second processing may be remittance processing using a transaction form and handling cash, and in execution of the second processing, the secondary processing machine may take and store the transaction form and the cash therein.

Of the processing using the transaction form, processing handling cash is mainly performed by the secondary processing machine. Each of the primary processing machine and the secondary processing machine can execute the processing using the transaction form. According to whether or not cash is handled, the processing is assigned to the primary processing machine or the secondary processing machine.

The second processing may be remittance processing using a transaction form and handling cash, in execution of the second processing, the primary processing machine may take and store the transaction form therein, and provide the customer with the information for guiding the customer to the secondary processing machine, and in execution of the second processing, the secondary processing machine may take and store the cash therein.

The primary processing machine and the secondary processing machine divide up one type of processing, and therefore, the operational efficiency in the financial facility is improved.

The first processing may be remittance processing, using a transaction form, and making transfer from the customer's account, and in execution of the first processing, the primary processing machine may take and store the transaction form therein, and make the transfer from the customer's account.

Of the processing using the transaction form, processing not handling cash is performed by the primary processing machine. According to whether or not cash is handled, the processing using the transaction form is assigned to the primary processing machine or the secondary processing machine.

The primary processing machine may determine whether or not the medium targeted for the first processing is normal, in a case where the medium is normal, the primary processing machine may store the medium therein, and in a case where the medium is not normal, the primary processing machine may provide, without storing the medium, the customer with the information for guiding the customer to the secondary processing machine.

In a case where the medium is normal, the customer can complete the first processing using the primary processing machine. Only in a case where the medium is not normal, the customer is guided to the secondary processing machine. Occupation of the primary processing machine by one customer for a long period of time is reduced.

The secondary processing machine may include a first secondary processing machine and a second secondary processing machine, and in a case where the processing is second processing, the primary processing machine may provide the customer with information for guiding the customer to a secondary processing machine selected from the first secondary processing machine and the second secondary processing machine.

The second processing is assigned to the plurality of secondary processing machines, and therefore, the operational efficiency in the financial facility is improved.

The function of the first secondary processing machine and the function of the second secondary processing machine may be different from each other.

The processing is assigned to the first secondary processing machine or the second secondary processing machine according to the second processing, and therefore, the operational efficiency in the financial facility is improved.

In a case where the second processing is executable by each of the first secondary processing machine and the second secondary processing machine, the primary processing machine may provide the customer with information for guiding the customer to a secondary processing machine selected based on the preset order of priority.

The second processing is assigned to the plurality of secondary processing machines based on the order of priority, and therefore, the operational efficiency in the financial facility is improved.

In a case where the second processing is executable by each of the first secondary processing machine and the second secondary processing machine, the primary processing machine may provide the customer with information for guiding the customer to a secondary processing machine selected based on the operation status of the first secondary processing machine and the operation status of the second secondary processing machine.

The second processing is assigned to the secondary processing machine more suitable for execution of the second processing. It is advantageous in improvement of the operational efficiency in the financial facility.

In a case where the second processing is executable by each of the first secondary processing machine and the second secondary processing machine, the primary processing machine may provide the customer with information for guiding the customer to a secondary processing machine selected based on the congestion status of the first secondary processing machine and the congestion status of the second secondary processing machine.

The second processing is assigned to the not-congested secondary processing machine. It is advantageous in improvement of the operational efficiency in the financial facility.

In a case where the primary processing machine receives first-second processing and second-second processing, the primary processing machine may provide the customer with both information for guiding the customer to the first secondary processing machine for the first-second processing and information for guiding the customer to the second secondary processing machine for the second-second processing.

The customer can smoothly complete the first-second processing and the second-second processing using two secondary processing machines.

The first secondary processing machine may be a medium processing machine placed in a lobby and operated by the customer, and the second secondary processing machine may be a medium processing machine placed in the lobby and operated by the customer.

A plurality of customer can use the plurality of secondary processing machines placed in the lobby, and therefore, the operational efficiency in the financial facility is improved.

The first secondary processing machine may be a medium processing machine placed in a lobby and operated by the customer, and the second secondary processing machine may be a medium processing machine placed at a manned counter and operated by a clerk.

The customer can use the secondary processing machine placed at the manned counter while receiving assistance from the clerk, and therefore, can smoothly complete the processing.

A control circuitry of the primary processing machine may determine whether the received processing is the first processing or the second processing, and switch between a mode of storing the medium and a mode of providing the information.

Determination by the control circuitry of the primary processing machine simplifies the system configuration.

A management computer connected to the primary processing machine may determine whether the processing received by the primary processing machine is the first processing or the second processing, and switch between a mode of storing the medium in the primary processing machine and a mode of providing the information by the primary processing machine.

The management computer can manage a service in the financial facility while managing both the primary processing machine and the secondary processing machine.

The primary processing machine may include a plurality of primary processing machines, and the plurality of primary processing machines may execute the processing independently of each other.

The primary processing machine is an inexpensive device. Placement of the plurality of primary processing machines in the financial facility allows smooth execution of the service in the financial facility.

Hereinafter, an embodiment of a medium processing method will be described with reference to the drawings. The medium processing method described herein is an example.

Here, terms used below are defined. A term "primary" means "first" or "beginning." The term "primary" used below can be rephrased into "preceding." A term "secondary" means "second" or "next." The term "secondary" used below can be rephrased into "subsequent."

A financial facility includes a bank. Note that the financial facility is not limited to the bank. A service office is an office to which a customer visits for various types of processing. Account transfer processing and bank transfer processing will be referred to as "remittance processing," and are not distinguished from each other. Note that the account transfer processing is money transfer between accounts in the same name in the same office of the same financial facility. The bank transfer processing is money transfer between different banks, money transfer between different service offices of the same financial facility, or money transfer between accounts in different names in the same service office of the same financial facility.

FIG. 1 shows, as an example, a lobby of a service office 1 of a financial facility where the medium processing method is performed. FIG. 1 schematically shows the service office 1. In the lobby of the service office 1, a primary processing machine 2 and a secondary processing machine 3 are placed. The primary processing machine 2 is a device to be first operated by a customer having visited the service office 1. As described later, the primary processing machine 2 is configured to perform various types of processing. In a case where the primary processing machine 2 can execute processing requested by the customer, the customer performs the processing using the primary processing machine 2. In a case where the primary processing machine 2 cannot execute the processing requested by the customer, the customer performs the processing using the secondary processing machine 3. The customer operates the secondary processing machine 3. In the service office 1, the processing requested by the customer is assigned to the primary processing machine 2 and the secondary processing machine 3. Processing assignment improves an operational efficiency in the service office 1.

Figure 2:
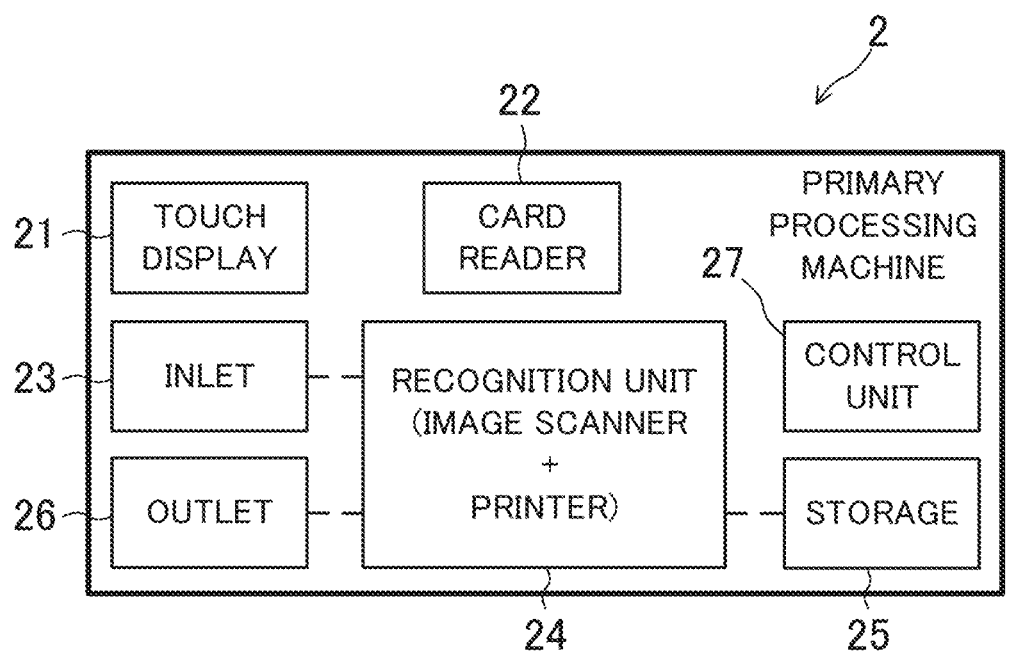
FIG. 2 shows, as an example, a primary processing machine.

FIG. 2 shows the exemplary primary processing machine 2. The primary processing machine 2 includes a touch display 21, a card reader 22, an inlet 23, a recognition unit 24, a storage an outlet 26, and a control unit 27. As described later, the primary processing machine 2 is a device not handling cash. The primary processing machine 2 is a device that neither newly stores cash nor stores cash in advance. The primary processing machine 2 may be placed in a fixed manner in the lobby of the service office 1, or may be of a transportable type.

The touch display 21 is a display and an operation unit. The customer touches the touch display 21 while viewing information displayed on the touch display 21, thereby inputting various types of information and/or instructions. The primary processing machine 2 may include a display and/or an operation unit instead of the touch display 21 or in addition to the touch display 21.

The card reader 22 reads information on a card owned by the customer. The primary processing machine 2 identifies the customer based on the information (e.g., information on an account number) read by the card reader 22 and the information (e.g., a personal identification number) input via the touch display 21. The primary processing machine 2 may include a biometric identification machine instead of the card reader 22 or in addition to the card reader 22.

The inlet 23 is a portion into which a medium targeted for the processing is inserted by the customer. The primary processing machine 2 does not handle cash. The medium to be inserted into the inlet 23 is, for example, a transaction form or check to be used for the bank transfer. A customer's passbook may be inserted into the inlet 23. The inlet 23 sends the inserted medium into the device.

The recognition unit 24 has an image scanner and a printer. The image scanner acquires an image of the medium taken in through the inlet 23. The acquired image is stored in the primary processing machine 2 or a management device connected to the primary processing machine 2. In the example of FIG. 2, the recognition unit 24 has the image scanner and the printer, but the primary processing machine 2 may include a printer in addition to a recognition unit 24 having an image scanner.

The recognition unit 24 has an optical character reader (OCR) function of reading characters and numbers printed on the transaction form or the check. The recognition unit 24 further has a code reader function of reading a code (barcode or two-dimensional code) printed on the transaction form or the check. The recognition unit 24 recognizes whether or not the medium taken in through the inlet 23 is normal.

The printer performs printing on the medium taken in through the inlet 23. The printer performs printing for invalidation on, e.g., the check.

The storage 25 stores the medium (i.e., transaction form or check) taken in through the inlet 23 and recognized as normal by the recognition unit 24. The medium stored in the storage 25 is the transaction form for remittance or the check on which printing for invalidation has been performed. These media have no value. Thus, for the primary processing machine 2, security equivalent to that of a safe is not required. The primary processing machine 2 is a relatively-inexpensive device having a simple structure.

The outlet 26 is a portion from which the medium recognized as not normal by the recognition unit 24 is taken out. The outlet 26 may be a portion from which the customer's passbook taken into the primary processing machine 2 is taken out. The outlet 26 may be a portion from which a receipt of the processing executed by the primary processing machine 2 is taken out. Note that the inlet 23 and the outlet 26 may be integrated.

The control unit 27 controls the primary processing machine 2. Under the control of the control unit 27, the primary processing machine 2 executes various types of processing. The control unit 27 includes at least a processor, a memory, and an interface (I/F) circuit. The processor executes a program. The memory stores programs and data for operation of the processing machine. The memory is, for example, a random access memory (RAM) and/or a read only memory (ROM). The I/F circuit exchanges an electric signal between the control unit 27 and each device connected to the control unit 27.

The secondary processing machine 3 is of a type different from that of the primary processing machine 2. The secondary processing machine 3 is an automatic processing machine such as an ATM or a self-processing machine. The ATM has a function of executing cash handling processing including cash depositing and dispensing processing. The ATM can execute remittance processing without a transaction form. The ATM can also execute remittance processing from a customer's account in addition to cash remittance processing. The ATM has complex functions. Note that the ATM may have a function of handling a check.

The self-processing machine has a function of handling a transaction form and a check in addition to all the functions of the ATM. The self-processing machine may further include a forcibly-deposited cash safe. The forcibly-deposited cash safe stores an envelope including cash which cannot be received by the device. The self-processing machine also has complex functions. Note that the self-processing machine may be a device having a function of handling a transaction form and a check and a function of handling cash, but not having the functions of the ATM.

The secondary processing machine 3 is a well-known device. As described above, the secondary processing machine 3 includes, for example, the ATM, the self-processing machine, and the depositing and dispensing machine. The secondary processing machine 3 is different from the primary processing machine 2 in handling cash. The secondary processing machine 3 can perform some or all types of processing executable by the primary processing machine 2, and can also perform processing inexecutable by the primary processing machine 2.

Next, the medium processing method will be described in detail with reference to FIG. 1. First, a customer having entered the office through a doorway 10 of the service office 1 operates the primary processing machine 2 (see an arrow 11).

The touch display 21 of the primary processing machine 2 displays a menu screen. On the menu screen, the customer performs an operation of selecting desired processing. Here, the following example will be described: processing selectable by the customer includes the following four types of processing which are (1) check encashment processing of making deposit to a customer's account (processing not handling cash);
(2) check encashment processing of withdrawing cash;
(3) remittance processing of transferring, using a transaction form, money withdrawn from the customer's account (processing not handling cash); and
(4) remittance processing of receiving and transferring cash using a transaction form.

The processing types (1) to (4) include both the processing executable by the primary processing machine 2 and the processing inexecutable by the primary processing machine 2. That is, the touch display 21 of the primary processing machine 2 displays the menu screen including the processing executable by the primary processing machine 2 and the processing inexecutable by the primary processing machine 2. The customer performs an operation of selecting any processing in the primary processing machine 2. The primary processing machine 2 receives both the processing executable by the primary processing machine 2 and the processing inexecutable by the primary processing machine 2.

In a case where the processing (1) or (3) not handling cash is selected from the above-described four processing types, the primary processing machine 2 executes such processing.

In a case where the primary processing machine 2 executes the check encashment processing (1) of making deposit to the customer's account, the card reader 22 reads customer's card information, and the touch display 21 asks the customer to input a personal identification number. The primary processing machine 2 identifies the customer based on the card information and the personal identification number.

The primary processing machine 2 asks the customer to insert a check targeted for the processing into the inlet 23. The inlet 23 sends the inserted check into the primary processing machine 2. The image scanner of the recognition unit 24 captures an image of the check, and determines whether or not the check is normal. In a case where the check is not normal, such a check is taken out to the outlet 26. In a case where the check is normal, the control unit 27 makes deposit to the customer's account based on check information (specifically, the amount of money) read by the recognition unit 24. The printer of the recognition unit 24 performs printing for invalidation on the check for which the depositing processing has been completed, and the storage stores the invalidated check.

In a case where the primary processing machine 2 executes the remittance processing (3) of transferring, using the transaction form, the money withdrawn from the customer's account, the card reader 22 reads the customer's card information and the touch display 21 asks the customer to input the personal identification number, as in the above-described case. The primary processing machine 2 identifies the customer.

The primary processing machine 2 asks the customer to insert the transaction form targeted for the processing into the inlet 23. The inlet 23 sends the inserted transaction form into the primary processing machine 2. The image scanner of the recognition unit 24 captures an image of the transaction form, and determines whether or not the transaction form is normal. In a case where the transaction form is not normal, such a transaction form is taken out to the outlet 26. In a case where the transaction form is normal, the control unit 27 makes withdrawal from the customer's account and makes transfer to a beneficiary read from the transaction form based on transaction form information (specifically, the amount of money) read by the recognition unit 24. The storage 25 stores the transaction form for which the remittance processing has been completed.

After the primary processing machine 2 has completed the processing, the customer exits the service office 1 as indicated by 101 of FIG. 1 (see an arrow 12). The customer can complete the processing using only the primary processing machine 2. This saves customer's trouble. The above-described processing (1), (3) is processing executable also by the secondary processing machine 3, but is executed not by the secondary processing machine 3 but by the primary processing machine 2. While the primary processing machine 2 is executing the processing, another customer can execute, using the secondary processing machine 3, another type of processing such as the processing inexecutable by the primary processing machine 2. Plural types of processing are executed in parallel by the plurality of processing machines, and therefore, the operational efficiency in the service office 1 of the financial facility is improved.

In a case where the processing (2) or (4) handling cash is selected from the above-described four processing types, the primary processing machine 2 provides, via the touch display 21, the customer with information for guiding the customer to the secondary processing machine 3. As indicated by 102 of FIG. 1, the customer moves to the secondary processing machine 3 according to the guide (see an arrow 13), and the secondary processing machine 3 performs the check encashment processing (2) of withdrawing cash or the remittance processing (4) of receiving and transferring cash using the transaction form. The processing executed by the secondary processing machine 3 is processing executed by a well-known device, and therefore, detailed description thereof will be omitted. After the secondary processing machine 3 has completed the processing, the customer exits the service office 1 (see an arrow 14).

In this system, the customer having visited the service office 1 first operates the primary processing machine 2, and the primary processing machine 2 assigns the processing. The secondary processing machine 3 mainly executes the processing (2), (4) inexecutable by the primary processing machine 2. The processing is assigned to the primary processing machine 2 or the secondary processing machine 3 depending on the processing, and therefore, this system can improve the operational efficiency in the service office 1.

Moreover, the primary processing machine 2 executes part of the processing using the transaction form or the check, and therefore, the occupation time of the secondary processing machine 3 by one customer is shortened. The shorter occupation time improves the operational efficiency in the service office 1.

Note that in the case of selecting the check encashment processing (2) of withdrawing cash, the primary processing machine 2 and the secondary processing machine 3 may divide up the processing as follows. That is, the primary processing machine 2 asks the customer to insert the check, and such a check is taken into and stored in the primary processing machine 2. Then, the primary processing machine 2 guides the customer to the secondary processing machine 3. The customer moves to the secondary processing machine 3 according to the guide. The secondary processing machine 3 identifies the customer, and withdraws cash equivalent to the amount of money on the above-described check. The customer receives, from the secondary processing machine 3, the cash equivalent to the check inserted into the primary processing machine 2.

Similarly, in the case of selecting the remittance processing (4) of receiving and transferring cash using the transaction form, the primary processing machine 2 and the secondary processing machine 3 may divide up the processing as follows. That is, the primary processing machine 2 asks the customer to insert the transaction form, and such a transaction form is taken into and stored in the primary processing machine 2. Then, the primary processing machine 2 guides the customer to the secondary processing machine 3. The customer moves to the secondary processing machine 3 according to the guide. The secondary processing machine 3 identifies the customer. The customer puts cash equivalent to the amount of money on the above-described transaction form into the secondary processing machine 3. The secondary processing machine 3 takes in and stores the cash, and performs the remittance processing.

(Modifications of Primary Processing Machine)

Figure 3A:
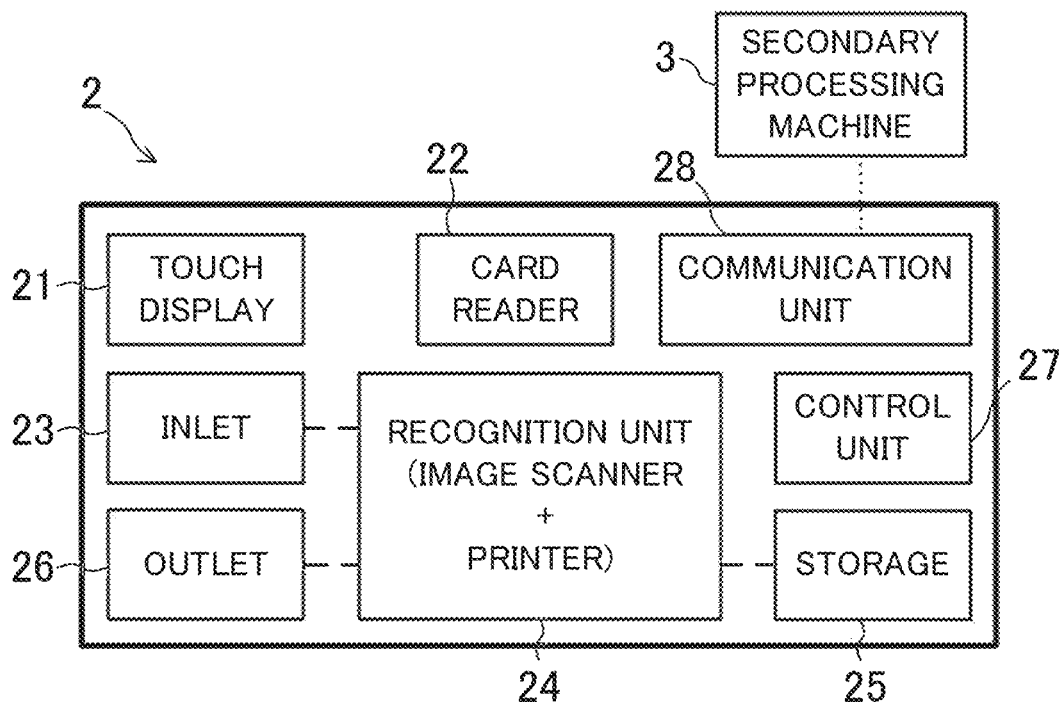
FIG. 3A shows a modification of the primary processing machine.

FIG. 3A shows a modification of the primary processing machine 2. The primary processing machine 2 is a modification of the primary processing machine of FIGS. 1 and 2. The primary processing machine 2 includes the touch display 21, the card reader 22, the inlet 23, the recognition unit 24, the storage 25, the outlet 26, the control unit 27, and a communication unit 28. The communication unit 28 exchanges information between the primary processing machine 2 and the secondary processing machine 3 via wired communication or wireless communication.

The communication unit 28 allows information transmission between the primary processing machine 2 and the secondary processing machine 3. In a case where the customer is guided from the primary processing machine 2 to the secondary processing machine 3 as indicated by 102 of FIG. 1, the primary processing machine 2 can provide the secondary processing machine 3 with already-acquired information. The primary processing machine 2 may provide the secondary processing machine 3 with, e.g., the customer information and information on the processing selected by the customer. When the customer performs predetermined identification operation on the secondary processing machine 3, the secondary processing machine 3 can take over the processing using the information provided from the primary processing machine 2. The customer does not need to input the information to the secondary processing machine 3 again.

Figure 3B:
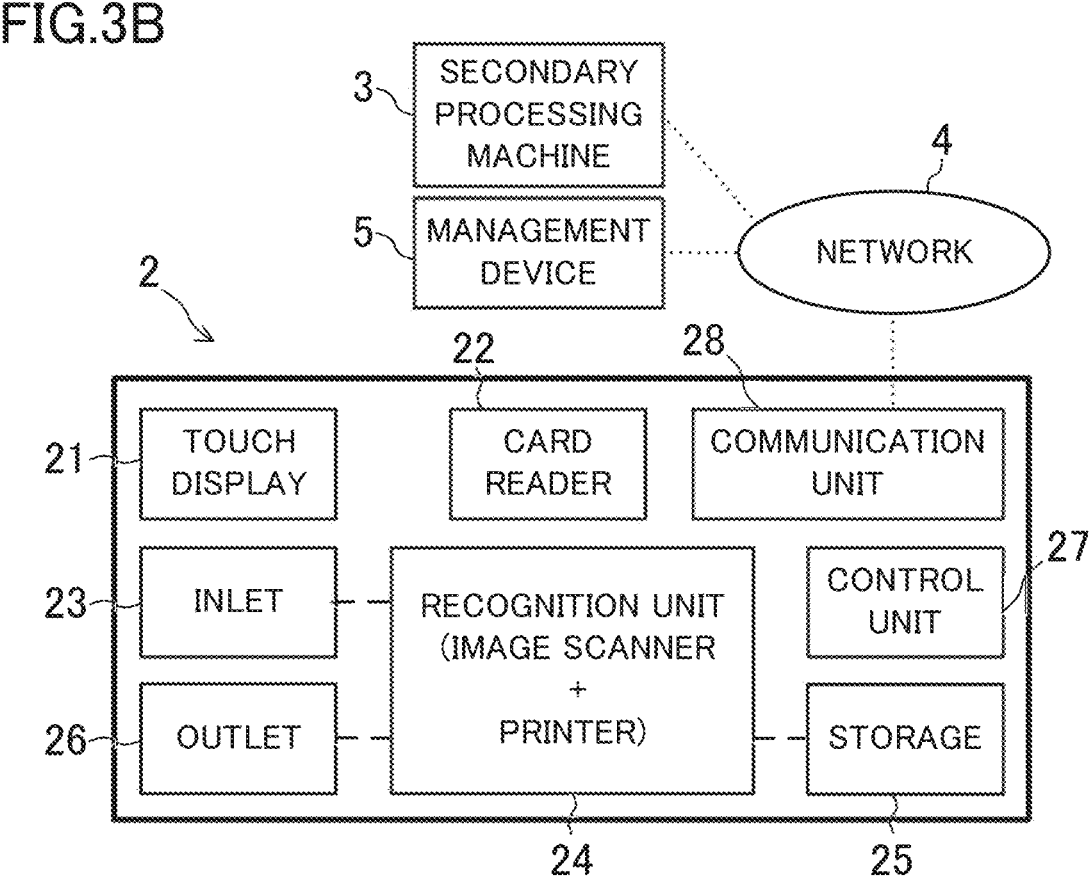
FIG. 3B shows, as an example, a system including the primary processing machine.

FIG. 3B shows a modification of the system including the primary processing machine 2 and the secondary processing machine 3. This system is a modification of the system of FIG. 1. The system further includes a management device 5. The primary processing machine 2, the secondary processing machine 3, and the management device 5 are connected to a network 4. The network 4 is a wide or narrow area network.

The management device 5 includes at least a processor, a memory, and an I/F circuit. The processor executes a program. The memory stores programs and data for operation of the management device 5. The memory is, for example, a RAM and/or a ROM. The I/F circuit exchanges an electric signal between components of the management device 5, and exchanges an electric signal between the management device 5 and a device connected to the management device 5.

The management device 5 can acquire information on each of the primary processing machine 2 and the secondary processing machine 3 via the network 4, and can provide each of the primary processing machine 2 and the secondary processing machine 3 with information via the network 4. The management device 5 is placed in the service office 1, or is placed in a location different from the service office 1.

In this system, the primary processing machine 2 and the secondary processing machine 3 are also communicable with each other. In a case where the customer is guided from the primary processing machine 2 to the secondary processing machine 3 as indicated by 102 of FIG. 1, the primary processing machine 2 can provide the secondary processing machine 3 with the already-acquired information via the network 4 and the management device 5. The customer does not need to input the information to the secondary processing machine 3 again. For example, in a case where the primary processing machine 2 has acquired the customer's card information, the secondary processing machine 3 may acquire the customer's card information from the primary processing machine 2. This improves the operational efficiency in the office because the customer does not need to perform overlapping operation.

Second Embodiment of System

Figure 4:
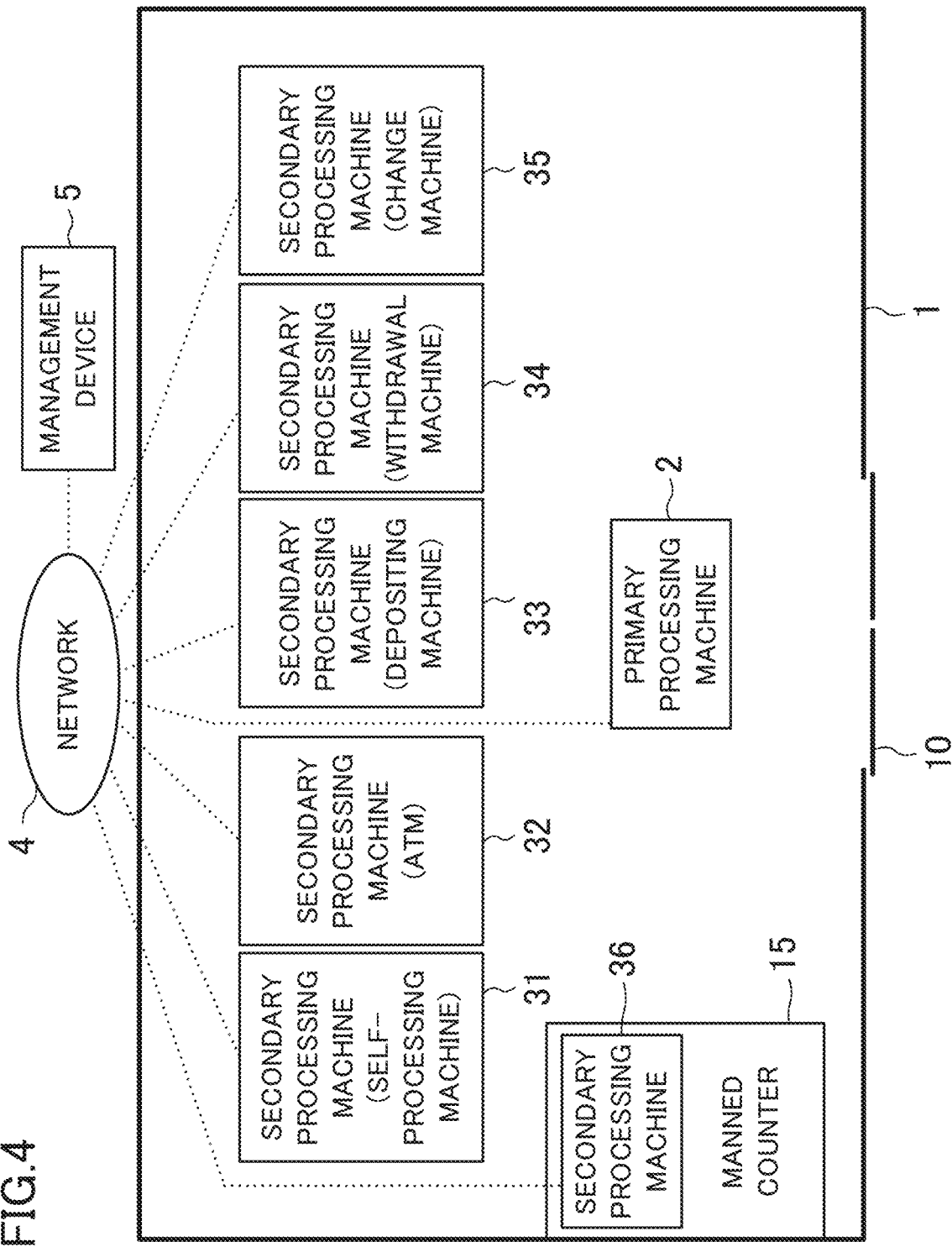
FIG. 4 shows, as an example, a system according to a second embodiment.

FIG. 4 shows a second embodiment of the system. This system is a modification of the system of FIG. 1. The system is built in the service office 1 of the financial facility. The system includes the primary processing machine 2 and a plurality of secondary processing machines 31 to 36.

In the configuration example of FIG. 4, the plurality of secondary processing machines 31 to 36 are different from each other in type. Specifically, the secondary processing machine 31 is a self-processing machine, the secondary processing machine 32 is an ATM, the secondary processing machine 33 is a (cash) depositing machine, the secondary processing machine 34 is a (cash) withdrawal machine, and the secondary processing machine 35 is a money change machine. The secondary processing machines 31 to 35 are placed in the lobby of the service office 1. The secondary processing machine 36 is placed at a manned counter 15 provided in the service office 1.

The depositing machine is a device capable of executing only cash depositing processing. The depositing machine has one function. The withdrawal machine is a device capable of executing only cash withdrawal processing. The withdrawal machine has a single function. The money change machine is a device capable of executing only cash change processing. The money change machine has one function.

The secondary processing machine 36 placed at the manned counter 15 is, for example, a self-processing machine. A clerk, i.e., staff, of the financial facility assists, as necessary, a customer who operates the secondary processing machine 36. The customer can receive the assistance from the staff, and therefore, can smoothly complete the processing using the secondary processing machine 36. In some cases, the staff operates the secondary processing machine 36 on behalf of the customer. Note that the secondary processing machines 31 to 35 are basically processing machines to be operated only by customers.

The primary processing machine 2, each of the secondary processing machines 31 to 36, and the management device 5 are connected to the network 4. The management device 5 manages the primary processing machine 2 and each of the secondary processing machines 31 to 36.

Next, processing steps in the system will be described with reference to a flowchart of FIG. 5. Here, for the sake of easy understanding, it is assumed that the secondary processing machine 31 as the self-processing machine, the secondary processing machine 32 as the ATM, the secondary processing machine 36 placed at the manned counter 15, and the primary processing machine 2 are placed in the service office 1. As necessary, the primary processing machine 2 guides a customer to the secondary processing machine 32 as the ATM, the secondary processing machine 31 as the self-processing machine, or the secondary processing machine 36 at the manned counter 15. The primary processing machine 2 is capable of executing processing using a check, and is not capable of executing processing handling cash. Note that the primary processing machine 2 can execute processing using a transaction form as described above.

Figure 5:
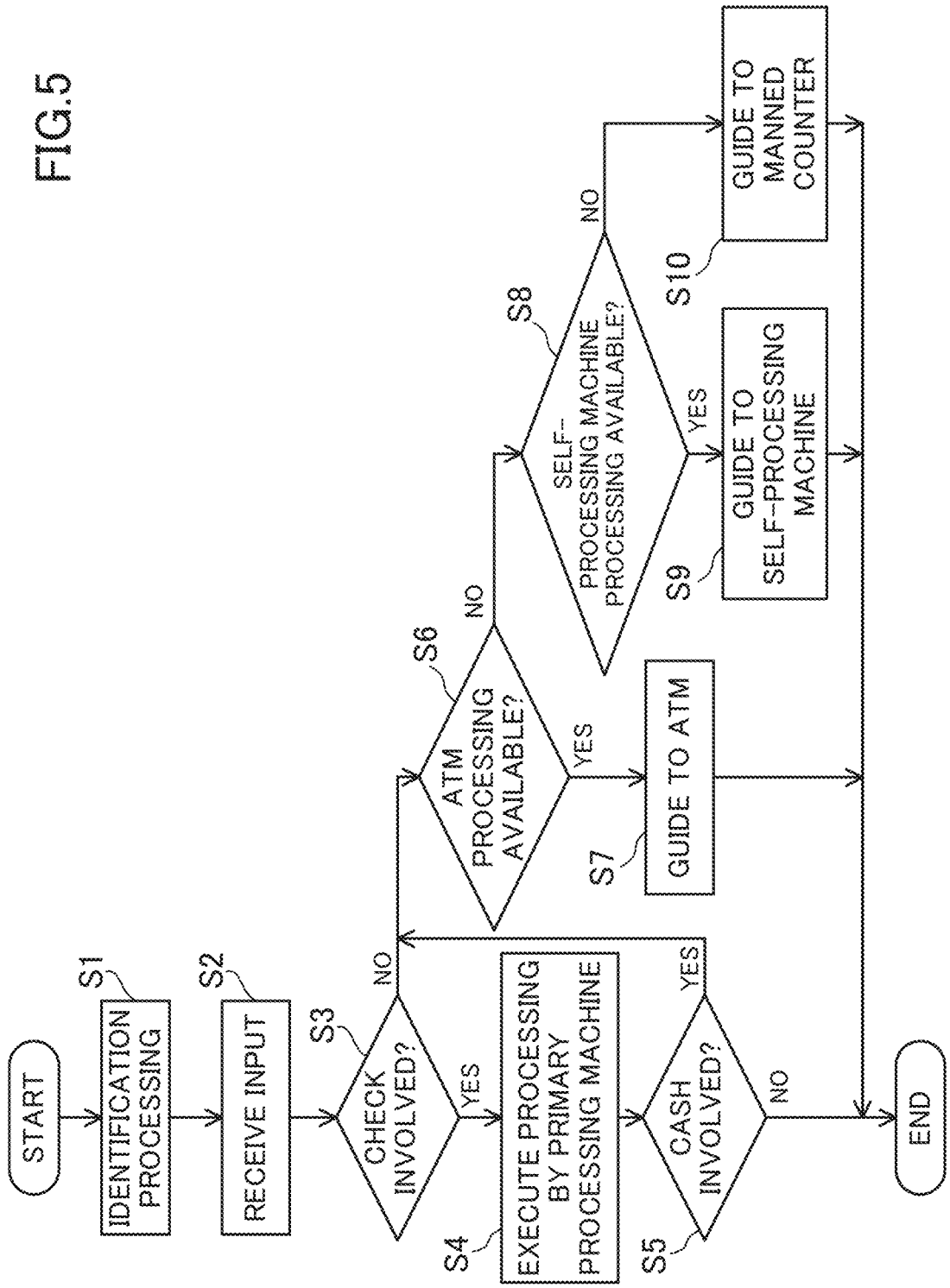
FIG. 5 is a flowchart according to the medium processing method.

The flowchart of FIG. 5 shows the steps of processing executed by the control unit 27 of the primary processing machine 2. Thus, the subject of determination steps included in the flowchart of FIG. 5 is the control unit 27 of the primary processing machine 2. First, in Step S1, the primary processing machine 2 executes customer identification processing. Subsequently, in Step S2, the primary processing machine 2 receives a customer's request.

In Step S3, the control unit 27 of the primary processing machine 2 determines whether or not the processing requested by the customer includes processing involving a check. In a case where the answer of Step S3 is YES, the process proceeds to Step S4. In a case where the answer of Step S3 is NO, the process proceeds to Step S6.

In Step S4, the primary processing machine 2 executes the processing involving the check. Specifically, the customer inserts the check targeted for the processing into the inlet 23 of the primary processing machine 2, and the primary processing machine 2 takes in the inserted check and stores the check in the storage 25.

Subsequently, in Step S5, the control unit 27 of the primary processing machine 2 determines whether or not the processing requested by the customer includes processing involving cash. In a case where there is no processing involving cash, i.e., NO, the process ends. As described above, in a case where the processing is the check encashment processing of making deposit to the customer's account, no cash is handled, and therefore, the process ends.

On the other hand, in a case where there is the processing involving cash, i.e., YES in Step S5, the process proceeds to Step S6. As described above, in a case where the processing is the check encashment processing of withdrawing cash, cash is handled, and therefore, the process proceeds to Step S6. Also, in a case where the customer requests second processing which is different from the check encashment processing and handles cash, the process proceeds from Step S5 to Step S6.

In Step S6, the control unit 27 of the primary processing machine 2 determines whether or not the ATM can execute the processing requested by the customer. The ATM can execute, for example, processing not using a transaction form and a check, but using cash. In a case where the answer of Step S6 is YES, the process proceeds to Step S7.

In Step S7, the touch display 21 of the primary processing machine 2 provides the customer with the guide to the ATM.

The customer views the indication on the touch display 21, moves to the ATM, and performs desired processing using the ATM.

In a case where the processing requested by the customer is the above-described check encashment processing of withdrawing cash, the process proceeds from Step S6 to Step S7. The customer performs identification operation on the ATM to which the customer has been guided. The primary processing machine 2 provides the ATM with information on the check in advance. The ATM can withdraw cash based on the provided information. The customer receives the cash withdrawn from the ATM.

On the other hand, in a case where the answer of Step S6 is NO, the process proceeds to Step S8.

In Step S8, the control unit 27 of the primary processing machine 2 determines whether or not the self-processing machine can execute the processing requested by the customer. The self-processing machine can execute, for example, processing using a transaction form and a check. In a case where the answer of Step S8 is YES, the process proceeds to Step S9. The touch display 21 of the primary processing machine 2 provides the customer with the guide to the self-processing machine. The customer views the indication on the touch display 21, moves to the self-processing machine, and performs desired processing using the self-processing machine. In a case where the answer of Step S8 is NO, the process proceeds to Step S10.

In Step S10, the touch display 21 of the primary processing machine 2 provides the customer with the guide to the secondary processing machine 36 placed at the manned counter 15. The customer views the contents displayed on the touch display 21, and moves to the manned counter 15. The customer performs desired processing using the secondary processing machine 36 while receiving assistance from the staff.

Note that when executing the processing in Step S4, the primary processing machine 2 may determine whether or not the check taken in the primary processing machine 2 is normal. In a case where the check is normal, the primary processing machine 2 executes the processing. In a case where the check is not normal, the primary processing machine 2 may guide the customer to the secondary processing machine 3 such as the secondary processing machine 36 placed at the manned counter 15.

Note that the order of the steps of the flowchart of FIG. 5 is merely one example. The order of the steps may be changeable to the extent possible. Some of the steps may be omitted.

In the flowchart of FIG. 5, in the case of executing the check encashment processing of withdrawing cash, the customer inserts the check into the primary processing machine 2, and thereafter, receives cash from the secondary processing machine 3. That is, the primary processing machine 2 and the secondary processing machine 3 divides up one type of processing. Instead, in the case of executing the check encashment processing of withdrawing cash, the primary processing machine 2 may guide the customer to the secondary processing machine 3 without receiving the check. The customer inserts the check into the secondary processing machine 3, and the secondary processing machine 3 takes in and stores the check. Then, the secondary processing machine 3 withdraws cash corresponding to the amount of money on the check, and the customer can receive the cash withdrawn from the secondary processing machine 3. In this case, the customer operates the primary processing machine 2 to the minimum extent and operates the secondary processing machine 3, and therefore, operation is facilitated. Moreover, the processing is assigned to the primary processing machine 2 and the secondary processing machine 3 according to whether or not cash is handled, and therefore, the operational efficiency in the financial facility is improved.

Note that as in the above-described processing using the check, the primary processing machine 2 and/or the secondary processing machine 3 can also execute the remittance processing using the transaction form such that the processing is assigned according to whether or not the transaction form is used and whether or not cash is handled.

Note that in the flowchart of FIG. 5, the management device 5 executes the processing steps instead of the control unit 27 of the primary processing machine 2. That is, the subject of the determination steps included in the flowchart of FIG. 5 may be the management device 5.

For example, in a case where the processing requested by the customer is three types of processing which are first processing executable by the primary processing machine 2, first-second processing executable by the secondary processing machines 31 to 35, and second-second processing executable by the secondary processing machine 36 at the manned counter 15, the management device 5 first causes the primary processing machine 2 to execute the first processing. After completion of the first processing, the management device 5 guides, via the touch display 21 of the primary processing machine 2, the customer to each of the secondary processing machines 31 to 35 for executing the first-second processing and the secondary processing machine 36 for executing the second-second processing.

Note that the management device 5 may guide the customer as follows instead of guiding the customer via the touch display 21 of the primary processing machine 2. That is, the customer may be guided to the secondary processing machines 31 to 35 for executing the first-second processing, and after such secondary processing machines have executed the first-second processing, the management device 5 may guide, via these secondary processing machines, the customer again to the secondary processing machine 36 for executing the second-second processing. The management device 5 can determine, as needed, the operation status of each of the plurality of secondary processing machines. The management device 5 can guide the customer to the optimal second-second processing based on a situation at the timing of completion of the first-second processing by the secondary processing machine. Such control reduces a customer's waiting time, and improves the operational efficiency in the service office 1.

The primary processing machine 2 and the secondary processing machine 3 may cooperate with each other without the management device 5, thereby providing the customer with the guide.

Third Embodiment of System

Figure 6:
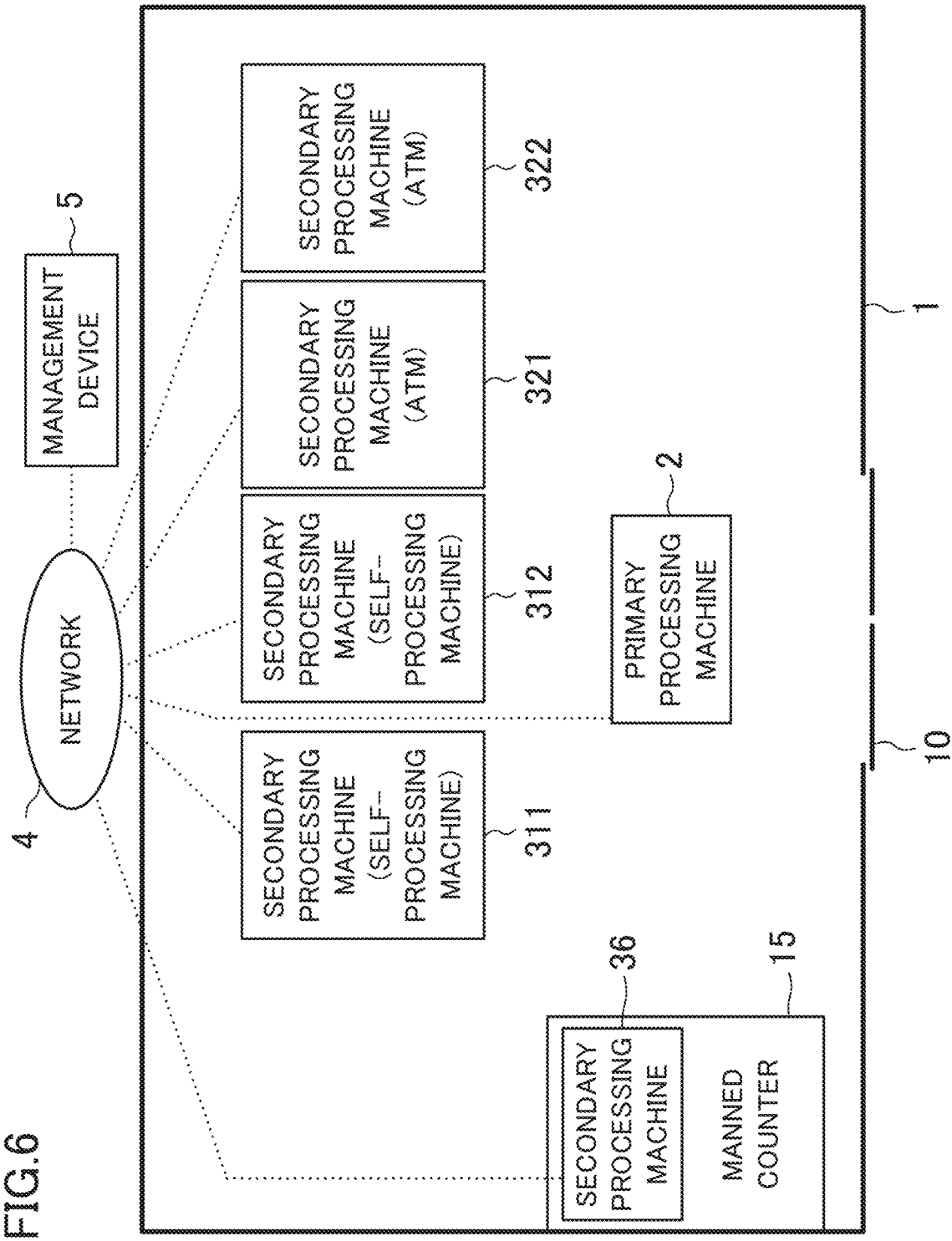
FIG. 6 shows, as an example, a system according to a third embodiment.

FIG. 6 shows a third embodiment of the system. This system is a modification of the system of FIG. 1. The system is built in the service office 1 of the financial facility. The system includes the primary processing machine 2 and a plurality of secondary processing machines 311, 312, 321, 322. The plurality of secondary processing machines 311, 312, 321, 322 are placed in the lobby of the service office 1.

Of the plurality of secondary processing machines, the secondary processing machine 311 and the secondary processing machine 312 are self-processing machines. The secondary processing machine 321 and the secondary processing machine 322 are ATMs. The system includes a plurality of secondary processing machines of the same type. Note that the secondary processing machine 36 is placed at the manned counter 15 in the service office 1.

The primary processing machine 2, each of the secondary processing machines 311, 312, 321, 322, and the management device 5 are connected to the network 4.

The control unit 27 of the primary processing machine 2 performs the control according to the flowchart of FIG. 5. In a case where the processing requested by the customer is executable by the ATM in Step S6 of the flow of FIG. 5, the control unit 27 of the primary processing machine 2 guides the customer to the secondary processing machine selected from the secondary processing machine 321 and the secondary processing machine 322.

The primary processing machine 2 may guide the customer to the secondary processing machine selected based on the order of priority set in advance.

The primary processing machine 2 may guide the customer to the secondary processing machine selected based on the operation status of the secondary processing machine 321 and the operation status of the secondary processing machine 322. The operation status may be, for example, the inventory amount of the secondary processing machine. That is, in a case where the cash depositing processing is requested, the primary processing machine 2 may compare the inventory amount of the secondary processing machine 321 and the inventory amount of the secondary processing machine 322 with each other to select the secondary processing machine with a smaller inventory amount. In a case where the cash withdrawal processing is requested, the primary processing machine 2 may compare the inventory amount of the secondary processing machine 321 and the inventory amount of the secondary processing machine 322 with each other to select the secondary processing machine with a greater inventory amount.

The operation status may be, for example, the number of banknotes/coins of a specific denomination stored in the secondary processing machine. The specific denomination may be a denomination whose banknote/coin circulating amount is the greatest among banknotes/coins circulating in an area where the secondary processing machine is placed. In a case where the depositing processing is requested, the primary processing machine 2 may select the secondary processing machine with a smaller number of banknotes/coins of the specific denomination. In a case where the withdrawal processing is requested, the primary processing machine 2 may select the secondary processing machine with a greater number of banknotes/coins of the specific denomination.

The operation status may be, for example, the number of times of processing by the secondary processing machine. That is, in order to equalize the number of times of processing among the plurality of secondary processing machines, the primary processing machine 2 may compare the number of times of processing by the secondary processing machine 321 and the number of times of processing by the secondary processing machine 322 with each other to select the secondary processing machine with a smaller number of times of processing. Instead of the number of times of processing, the primary processing machine 2 may select, based on a processing time, the secondary processing machine such that the processing time is equalized among the plurality of secondary processing machines.

The primary processing machine 2 may guide the customer to the secondary processing machine selected based on the congestion status of the secondary processing machine 321 and the congestion status of the secondary processing machine 322.

The congestion status can be determined by the control unit 27 of the primary processing machine 2. For example, in a case where each secondary processing machine includes a human sensor capable of sensing the number of customers in the front of such a secondary processing machine, the control unit 27 can receive information acquired by the human sensor to determine the congestion status of each secondary processing machine.

For example, in a case where a camera (e.g., security camera) that images the inside of the service office 1 is placed in the service office 1, the control unit 27 can acquire the image captured by the camera and analyze the image, thereby determining the congestion status of each secondary processing machine.

The primary processing machine 2 may compare the congestion status of the secondary processing machine 321 and the congestion status of the secondary processing machine 322 with each other to select the secondary processing machine with less congestion. With this configuration, the plurality of secondary processing machines can equally or substantially equally execute the processing.

Note that as in the above-described case, the management device 5 may control, instead of the primary processing machine 2, the system of FIG. 6 according to the flowchart of FIG. 5.

Fourth Embodiment of System

Figure 7:
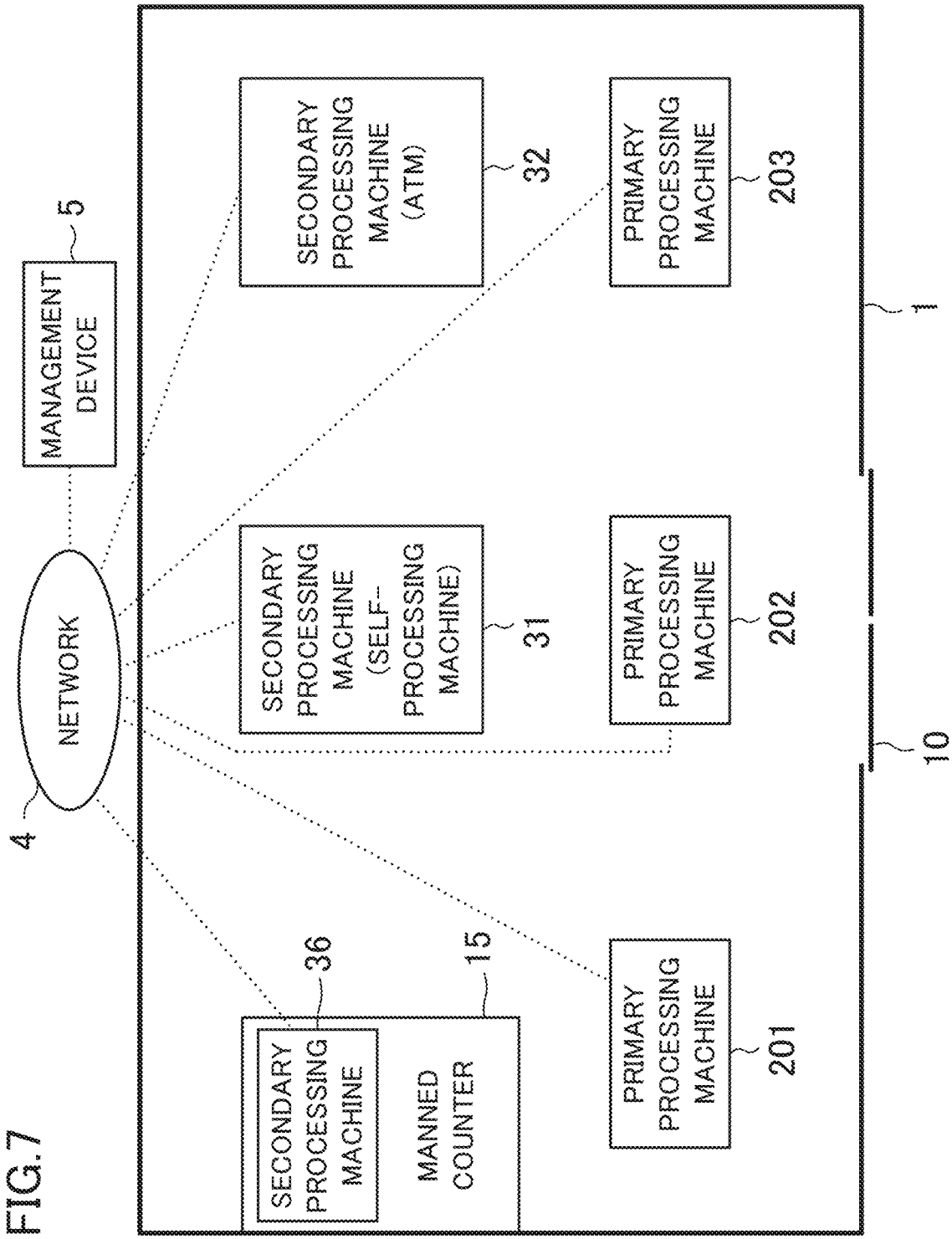
FIG. 7 shows, as an example, a system according to a fourth embodiment.

FIG. 7 shows a fourth embodiment of the system. This system is a modification of the system of FIG. 1. The system is built in the service office 1 of the financial facility. The system includes a plurality of primary processing machines 201, 202, 203 and a plurality of secondary processing machines 31, 32, 36.

The plurality of primary processing machines 201, 202, 203 are placed in the lobby of the service office 1. The plurality of primary processing machines 201, 202, 203 have the same function. The primary processing machines 201, 202, 203 execute processing independently of each other. Each of the primary processing machines 201, 202, 203 can receive a customer's request. As described above, the primary processing machine 2 is the relatively-inexpensive device. Even if the plurality of primary processing machines 201, 202, 203 is placed in one service office 1, a financial burden is small. The plurality of primary processing machines 201, 202, 203 improves the operational efficiency in the service office 1.

The system of FIG. 7 is controlled according to the flowchart of FIG. 5. In this system, the management device 5 may execute the flowchart of FIG. 5. The management device 5 can control each of the plurality of primary processing machines 201, 202, 203 and each of the secondary processing machines 31, 32, 36 in an integrated manner. In the system including the plurality of primary processing machines 201, 202, 203 and the plurality of secondary processing machines 31, 32, 36, the management device 5 can smoothly achieve cooperation of the primary processing machines and the secondary processing machines.

Note that the number of primary processing machines and the number of secondary processing machines are not necessarily the same as each other as in FIG. 7. The number of primary processing machines may be greater than the number of secondary processing machines.

Fifth Embodiment of System

Figure 8:
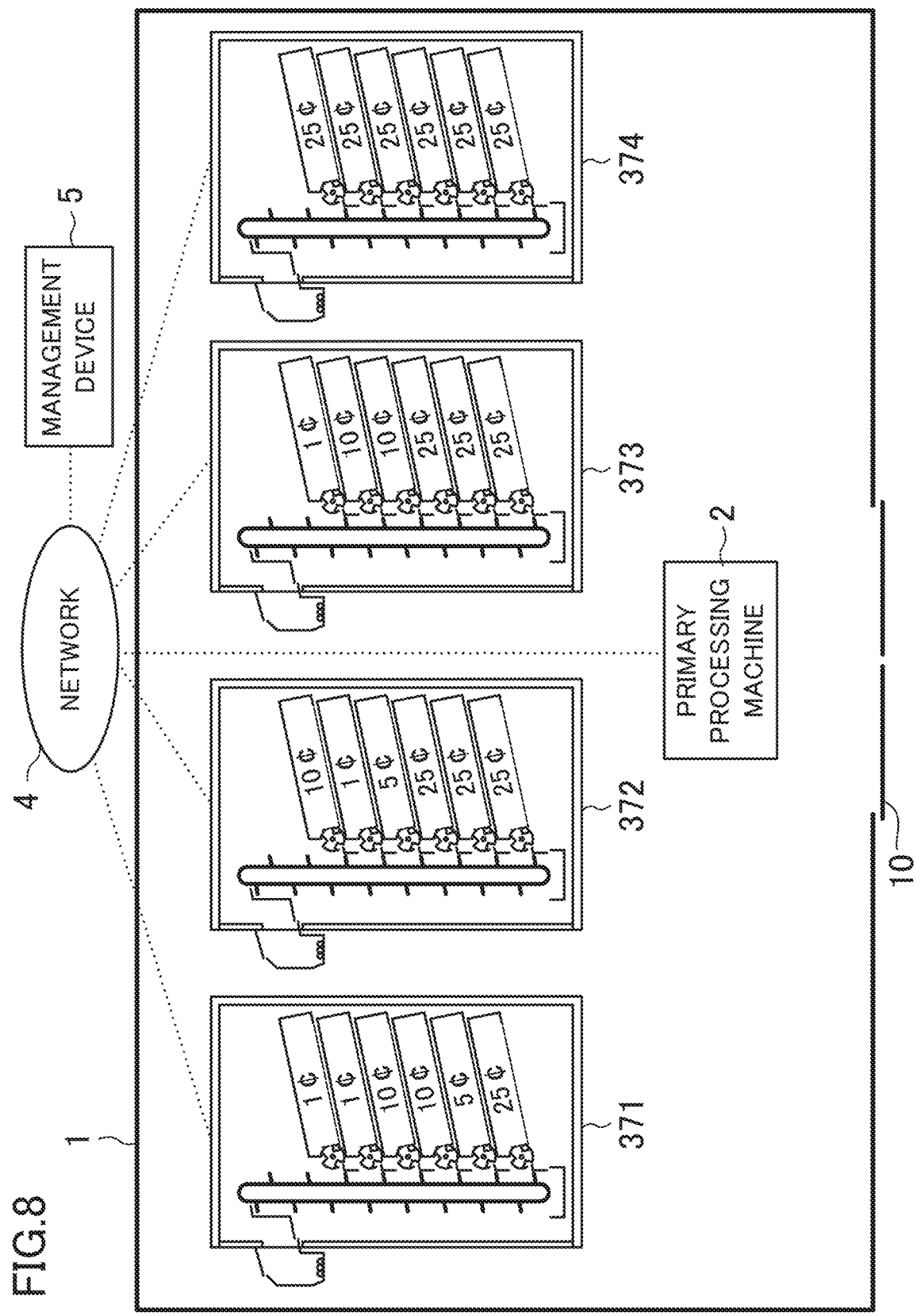
FIG. 8 shows, as an example, a system according to a fifth embodiment.

FIG. 8 shows a fifth embodiment of the system. This system is a modification of the system of FIG. 1. The system is built in the service office 1 of the financial facility. The system includes the primary processing machine 2 and a plurality of secondary processing machines 371, 372, 373, 374.

All the plurality of secondary processing machines 371, 372, 373, 374 have the same function. The secondary processing machines 371, 372, 373, 374 execute coin withdrawal processing. More specifically, the secondary processing machines 371, 372, 373, 374 execute coin-roll withdrawal processing. A coin-roll is a wrapped package of a plurality of coins stacked one another.

Figure 9:
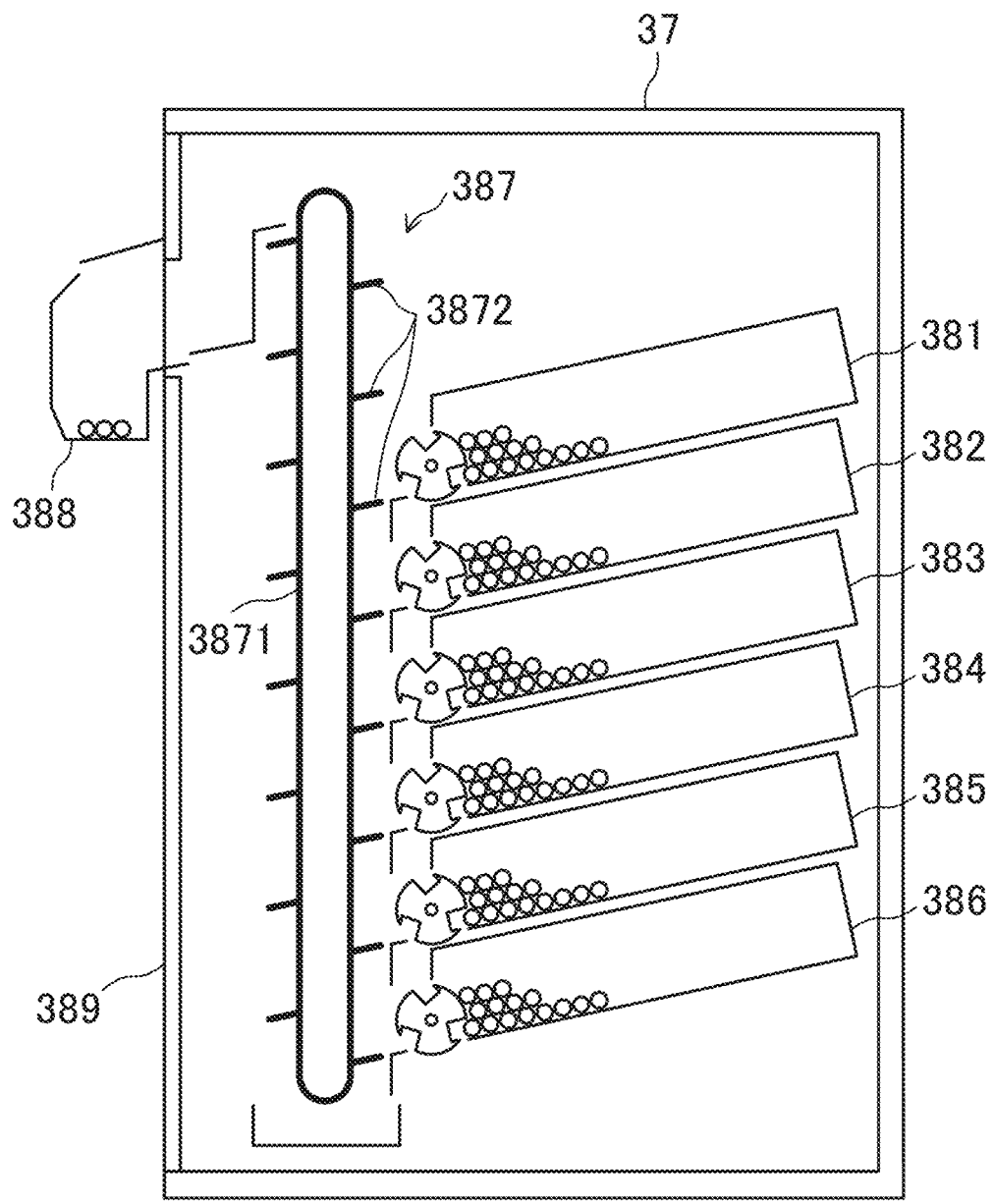
FIG. 9 shows, as an example, a secondary processing machine that executes coin-roll withdrawal processing.

FIG. 9 shows, as an example, the structure of a secondary processing machine 37. Each of the secondary processing machines 371, 372, 373, 374 has the same configuration as that of the secondary processing machine 37. The secondary processing machine 37 has six first to sixth storages 381 to 386, a lift 387, and an outlet 388.

Each of the storages 381 to 386 stores coin-rolls. Each of the storages 381 to 386 can store a plurality of coin-rolls. The storages 381 to 386 store coin-rolls of the same denomination. Each of the storages 381 to 386 can feed out the coin-rolls targeted for withdrawal one by one. The first to sixth storages 381 to 386 are arranged in the up-down direction in a housing 389 of the secondary processing machine 37. The denomination of the coin-rolls stored in each of the storages 381 to 386 may be different from or the same as each other among the storages 381 to 386 according to the type of usage of the secondary processing machine 37. For example, in the example of FIG. 9, the secondary processing machine 37 has the six storages, and therefore, can handle coins (coin-rolls) of one denomination at the minimum to six denominations at the maximum.

The lift 387 is positioned at the side of the first to sixth storages 381 to 386 arranged in the up-down direction. The lift 387 receives the coin-roll fed out of each of the storages 381 to 386, and transports such a coin-roll to the outlet 388. The lift 387 has a circulating belt 3871. A plurality of holding pieces 3872 is attached to the circulating belt 3871. The plurality of holding pieces 3872 is positioned at intervals. The plurality of holding pieces 3872 is positioned corresponding to the first to sixth storages 381 to 386. While the circulating belt 3871 is running counterclockwise in FIG. 9, the plurality of holding pieces 3872 moves up and down.

One holding piece 3872 holds one coin-roll. One storage feeds out one coin-roll per feeding. Before such a storage feeds out the next coin-roll, the circulating belt 3871 runs to move the empty holding piece 3872 to the position corresponding to such a storage. Note that the plurality of holding pieces 3872 can receive the coin-rolls simultaneously fed out of the plurality of storages 381 to 386. That is, in the example of FIG. 9, the number of coin-rolls fed out to the holding pieces from the storages in a state in which the circulating belt 3871 is stopped is six at the maximum.

The outlet 388 is positioned at an upper portion of the secondary processing machine 37. The coin-rolls transported by the lift 387 are taken out to the outlet 388. The outlet 388 can hold a plurality of coin-rolls at once. The customer can take out, with a hand, the coin-rolls held in the outlet 388.

The secondary processing machine 37 stores the denomination of the coin-rolls stored in each of the storages 381 to 386. When the denomination and number targeted for withdrawal are specified by the customer, the storages 381 to 386 storing the coin-rolls of the corresponding denomination feed out the specified number of coin-rolls. In synchronization with feeding from the storages 381 to 386, the circulating belt 3871 of the lift 387 runs. The specified number of coin-rolls of the specified denomination is taken out to the outlet 388.

Referring back to the system of FIG. 8, the pattern of the denominations of the stored coin-rolls is different among the secondary processing machines 371, 372, 373, 374. In the example of the configuration of FIG. 8, the first secondary processing machine 371, the second secondary processing machine 372, the third secondary processing machine 373, and the fourth secondary processing machine 374 store the coin-rolls of the following denominations.

The first secondary processing machine 371:
coin-rolls of one-cent coins in the first and second storages 381, 382,
coin-rolls of ten-cent coins in the third and fourth storages 383, 384,
coin-rolls of five-cent coins in the fifth storage 385, and
coin-rolls of 25-cent coins in the sixth storage 386;
the second secondary processing machine 372:
coin-rolls of ten-cent coins in the first storage 381,
coin-rolls of one-cent coins in the second storage 382,
coin-rolls of five-cent coins in the third storage 383, and
coin-rolls of 25-cent coins in the fourth, fifth, and sixth storages 384, 385, 386;
the third secondary processing machine 373:
coin-rolls of one-cent coins in the first storage 381,
coin-rolls of ten-cent coins in the second and third storages 382, 383, and
coin-rolls of 25-cent coins in the fourth, fifth, and sixth storages 384, 385, 386; and
the fourth secondary processing machine 374:
coin-rolls of 25-cent coins in the first to sixth storages 381 to 386.

Note that the second secondary processing machine 372 stores the coins of all the denominations. The setting of the denominations of the second secondary processing machine 372 is a default setting (standard setting).

Since the pattern of the denominations of the stored coins is different, the withdrawal processing is quickly completed by some secondary processing machines, but takes time by other secondary processing machines depending on the combination of the denominations of the coins whose withdrawal is requested by the customer.

For example, it is assumed that six coin-rolls of 25-cent coins are withdrawn. The secondary processing machine 372 stores the coin-rolls of the 25-cent coins in the fourth, fifth, and sixth storages 384, 385, 386. Thus, the secondary processing machine 372 can withdraw the six coin-rolls of the 25-cent coins by the following steps (1) to (4):

(1) each of the fourth, fifth, and sixth storages 384, 385, 386 feeds out the coin-roll of the 25-cent coins, and accordingly, the lift 387 holds three coin-rolls in total;

(2) the circulating belt 3871 of the lift 387 runs, and accordingly, the empty holding pieces 3872 move to positions corresponding to the fourth, fifth, and sixth storages 384, 385, 386;

(3) each of the fourth, fifth, and sixth storages 384, 385, 386 feeds out the coin-roll of the 25-cent coins, and accordingly, the lift 387 holds six coin-rolls in total; and (4) the circulating belt 3871 of the lift 387 runs, and accordingly, the six held coin-rolls are taken out to the outlet 388.

On the other hand, the fourth secondary processing machine 374 stores the coin-rolls of the 25-cent coins in the first to sixth storages 381 to 386. Thus, the fourth secondary processing machine 374 can withdraw the six coin-rolls of the 25-cent coins by the following steps (1) and (2):

(1) each of the first to sixth storages 381 to 386 feeds out the coin-roll of the 25-cent coins, and accordingly, the lift 387 holds six coin-rolls in total; and (2) the circulating belt 3871 of the lift 387 runs, and accordingly, the six held coin-rolls are taken out to the outlet 388.

Thus, in this case, if the fourth secondary processing machine 374 executes the withdrawal processing, the withdrawal processing is quickly completed.

As another example, it is assumed that four coin-rolls of 25-cent coins, four coin-rolls of ten-cent coins, and one coin-roll of one-cent coins are withdrawn. The secondary processing machine 372 can withdraw all the coin-rolls targeted for withdrawal by the following steps (1) to (8):

(1) the first storage 381 feeds out one coin-roll of ten-cent coins, the second storage 382 feeds out one coin-roll of one-cent coins, and each of the fourth, fifth, and sixth storages 384, 385, 386 feeds out one coin-roll of 25-cent coins, and accordingly, the lift 387 holds five coin-rolls in total;

(2) the circulating belt 3871 of the lift 387 runs, and accordingly, the empty holding pieces 3872 move to positions corresponding to the first and sixth storages 381, 386;

(3) the first storage 381 feeds out one coin-roll of ten-cent coins again, and the sixth storage 386 feeds out one coin-roll of 25-cent coins again;

(4) the circulating belt 3871 of the lift 387 runs, and accordingly, the empty holding piece 3872 moves to a position corresponding to the first storage 381;

(5) the first storage 381 feeds out one coin-roll of ten-cent coins again;

(6) the circulating belt 3871 of the lift 387 runs, and accordingly, the empty holding piece 3872 moves to a position corresponding to the first storage 381;

(7) the first storage 381 feeds out one coin-roll of ten-cent coins again; and (8) the circulating belt 3871 of the lift 387 runs, and accordingly, the held coin-rolls are taken out to the outlet 388. Note that in (2) and (4), some of the coin-rolls held by the lift 387 are also taken out to the outlet 388.

On the other hand, the third secondary processing machine 373 stores the coin-rolls of the ten-cent coins in each of the second and third storages 382, 383. Thus, the third secondary processing machine 373 can withdraw four coin-rolls of 25-cent coins, four coin-rolls of ten-cent coins, and one coin-roll of one-cent coins by the following steps (1) to (4):

(1) the first storage 381 feeds out one coin-roll of one-cent coins, each of the second and third storages 382, 383 feeds out one coin-roll of ten-cent coins, and each of the fourth, fifth, and sixth storages 384, 385, 386 one coin-roll of 25-cent coins, and accordingly, the lift 387 holds six coin-rolls in total;

(2) the circulating belt 3871 of the lift 387 runs, and accordingly, the empty holding pieces 3872 move to positions corresponding to the second, third, and sixth storages 382, 383, 386;

(3) each of the second and third storages 382, 383 feeds out one coin-roll of ten-cent coins again, and the sixth storage 386 feeds out one coin-roll of 25-cent coins again; and (4) the circulating belt 3871 of the lift 387 runs, and accordingly, the held coin-rolls are taken out to the outlet 388. Note that in (2), some of the coin-rolls held by the lift 387 are also taken out to the outlet 388.

Thus, in this case, if the third secondary processing machine 373 executes the withdrawal processing, the withdrawal processing is quickly completed.

In a case where the customer has requested withdrawal of coin-rolls, the primary processing machine 2 guides the customer to the secondary processing machine selected based on the operation statuses of the secondary processing machines 371, 372, 373, 374. The operation status described herein is, as described above, the pattern of the denominations of the coins stored in the secondary processing machine 371, 372, 373, 374. According to the combination of the denominations requested by the customer, the primary processing machine 2 selects the secondary processing machine with a shorter time required for the withdrawal processing. The customer's waiting time is reduced, and the operational efficiency in the service office 1 is improved.

Note that the primary processing machine 2 may select the secondary processing machine in consideration of not only the pattern of the denominations of the coins stored in the secondary processing machine 371, 372, 373, 374, but also the inventory amounts of the secondary processing machines 371, 372, 373, 374, the numbers of times of processing by the secondary processing machines 371, 372, 373, 374, and/or the congestion statuses of the secondary processing machines 371, 372, 373, 374.

The system of FIG. 8 may include a plurality of primary processing machines 2.

Instead of the primary processing machine 2, the management device 5 may control the system of FIG. 8.

The secondary processing machine that executes the coin-roll withdrawal processing may be used as one of the secondary processing machines in the systems of the FIGS. 4, 6, and 7.

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

What is claimed is:

1. A medium processing method, comprising:
   receiving, by a primary processing machine, first processing or second processing of a medium requested by a customer;
   storing, by the primary processing machine in a case where the first processing is requested by the customer, a medium targeted for the first processing in the primary processing machine, and accordingly completing the first processing; and providing, by the primary processing machine in a case where the second processing is requested by the customer, the customer with information for guiding the customer to a secondary processing machine, wherein the second processing includes check encashment processing of withdrawing cash, in execution of the second processing, the primary processing machine takes and stores a check therein, and provides the customer with the information for guiding the customer to the secondary processing machine, and in execution of the second processing, the secondary processing machine withdraws cash corresponding to an amount of money on the check therefrom.

2. The medium processing method of claim 1, wherein the first processing is check encashment processing of making deposit to a customer account, and in execution of the first processing, the primary processing machine takes and stores a check therein.

3. The medium processing method of claim 1, wherein the second processing further includes remittance processing using a transaction form and handling cash, and in execution of the second processing, the secondary processing machine takes and stores the transaction form and the cash therein.

4. The medium processing method of claim 1, wherein the second processing further includes remittance processing using a transaction form and handling cash, in execution of the second processing, the primary processing machine takes and stores the transaction form therein, and provides the customer with the information for guiding the customer to the secondary processing machine, and in execution of the second processing, the secondary processing machine takes and stores the cash therein.

5. The medium processing method of claim 1, wherein the first processing is remittance processing, using a transaction form, and making transfer from a customer's account, and in execution of the first processing, the primary processing machine takes and stores the transaction form therein, and makes the transfer from the customer's account.

6. The medium processing method of claim 1, further comprising:

storing, by the primary processing machine in a storage of the primary processing machine, a check serving as the medium;

determining, by the primary processing machine, whether or not the medium targeted for the first processing is normal;

storing, by the primary processing machine in a case where the medium is normal, the medium therein; and providing, by the primary processing machine in a case where the medium is not normal, without storing the medium, the customer with the information for guiding the customer to the secondary processing machine.

7. The medium processing method of claim 1, wherein the secondary processing machine includes a first secondary processing machine and a second secondary processing machine, and the medium processing method further comprises providing, by the primary processing machine, in the case where the second processing is requested by the customer, the customer with information for guiding the customer to a secondary processing machine selected from the first secondary processing machine and the second secondary processing machine.

8. The medium processing method of claim 7, wherein a function of the first secondary processing machine and a function of the second secondary processing machine are different from each other.

9. The medium processing method of claim 7, further comprising:

providing, by the primary processing machine in a case where the second processing is executable by each of the first secondary processing machine and the second secondary processing machine, the customer with information for guiding the customer to a secondary processing machine selected based on a preset order of priority.

10. The medium processing method of claim 7, further comprising:

providing, by the primary processing machine in a case where the second processing is executable by each of the first secondary processing machine and the second secondary processing machine, the customer with information for guiding the customer to a secondary processing machine selected based on an operation status of the first secondary processing machine and an operation status of the second secondary processing machine.

11. The medium processing method of claim 7, further comprising:

providing, by the primary processing machine in a case where the second processing is executable by each of the first secondary processing machine and the second secondary processing machine, the customer with information for guiding the customer to a secondary processing machine selected based on a congestion status of the first secondary processing machine and a congestion status of the second secondary processing machine.

12. The medium processing method of claim 7, further comprising:

providing, by the primary processing machine in a case where the primary processing machine receives first-second processing and second-second processing, the customer with both information for guiding the customer to the first secondary processing machine for the first-second processing and information for guiding the customer to the second secondary processing machine for the second-second processing.

13. The medium processing method of claim 7, wherein the first secondary processing machine is a medium processing machine in a lobby and operated by the customer, and the second secondary processing machine is a medium processing machine in the lobby and operated by the customer.

14. The medium processing method of claim 7, wherein the first secondary processing machine is a medium processing machine in a lobby and operated by the customer, and the second secondary processing machine is a medium processing machine at a manned counter and operated by a clerk.

15. The medium processing method of claim 1, further comprising:

determining, by control circuitry of the primary processing machine, whether the first processing or the second processing is received; and switching, by the control circuitry, between a mode of storing the medium and a mode of providing the information.

16. The medium processing method of claim 1, further comprising:
   determining, by a management computer connected to the primary processing machine, whether the first processing or the second processing is received; and
   switching, by the management computer, between a mode of storing the medium in the primary processing machine and a mode of providing the information by the primary processing machine.

17. The medium processing method of claim 1, wherein
   the primary processing machine includes a plurality of primary processing machines, and
   the plurality of primary processing machines executes processing independently of each other.

18. A medium processing method, comprising:
   receiving, by a primary processing machine, a customer request for medium processing;
   storing, by the primary processing machine in a case where the processing is first processing, a medium targeted for the first processing in the primary processing machine, and accordingly completing the first processing;
   providing, by the primary processing machine in a case where the processing is second processing, a customer with information for guiding the customer to a secondary processing machine, wherein the secondary processing machine includes a first secondary processing machine and a second secondary processing machine;
   providing, by the primary processing machine, in the case where the second processing is requested by the customer, the customer with information for guiding the customer to a secondary processing machine selected from the first secondary processing machine and the second secondary processing machine; and
   providing, by the primary processing machine in a case where the primary processing machine receives first-second processing and second-second processing, the customer with both information for guiding the customer to the first secondary processing machine for the first-second processing and information for guiding the customer to the second secondary processing machine for the second-second processing.

* * * * *